May 17, 1932.  W. J. ANDRES  1,858,354
BRAKE
Filed March 2, 1929   2 Sheets-Sheet 1
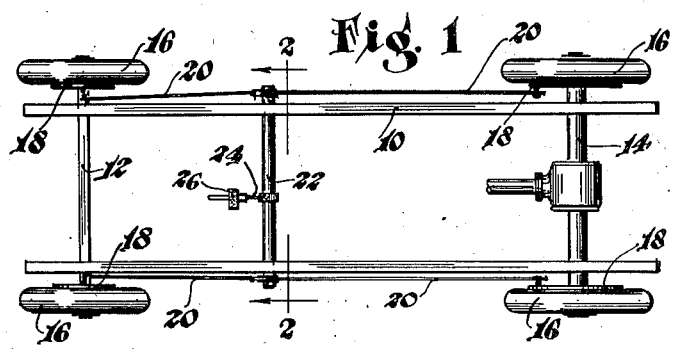
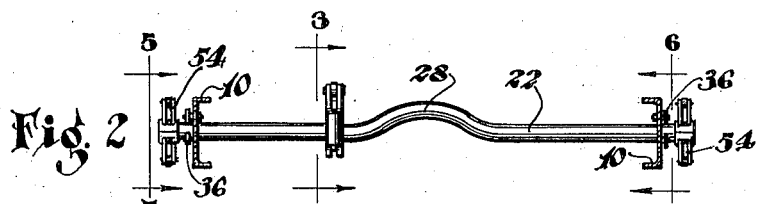
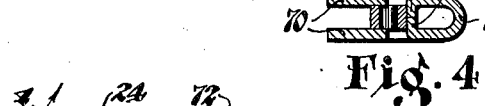
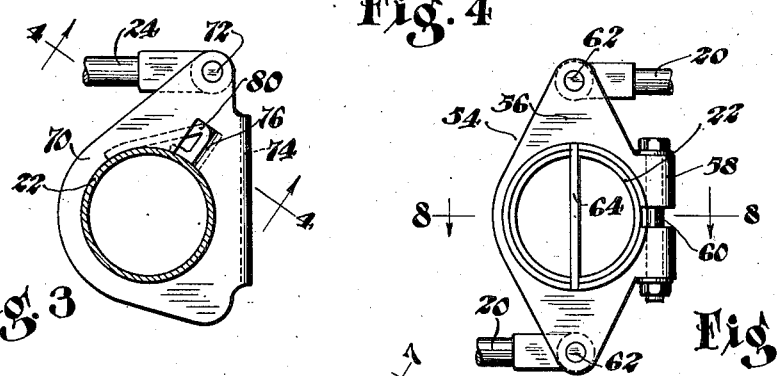
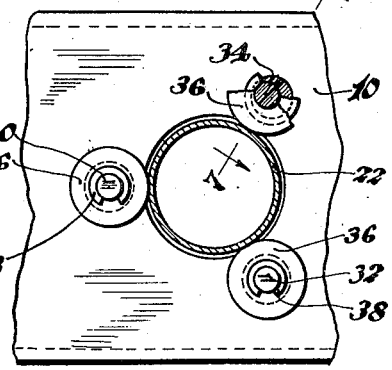
INVENTOR.
William J. Andres
BY
ATTORNEY May 17, 1932.  W. J. ANDRES  1,858,354
BRAKE
Filed March 2, 1929    2 Sheets-Sheet 2
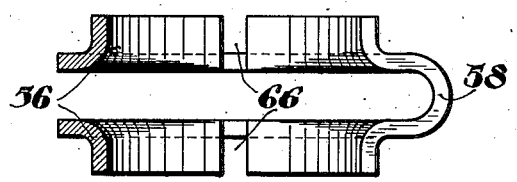
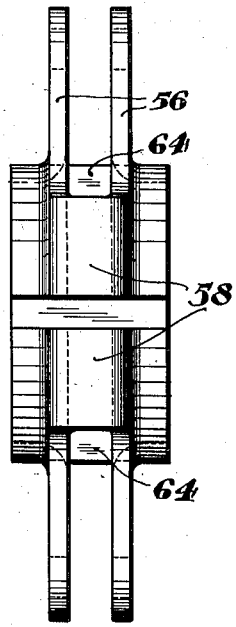
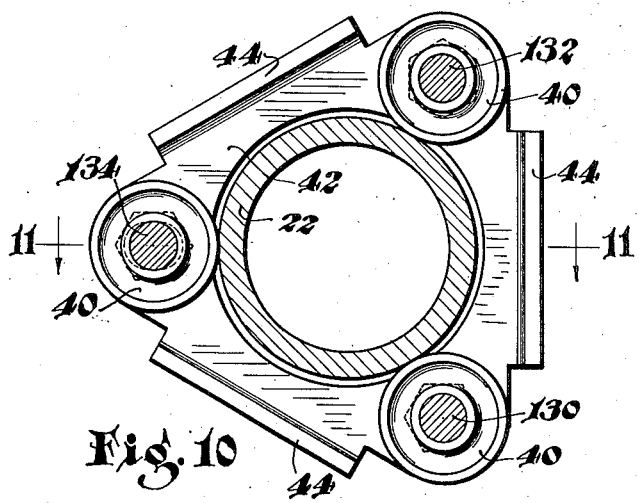
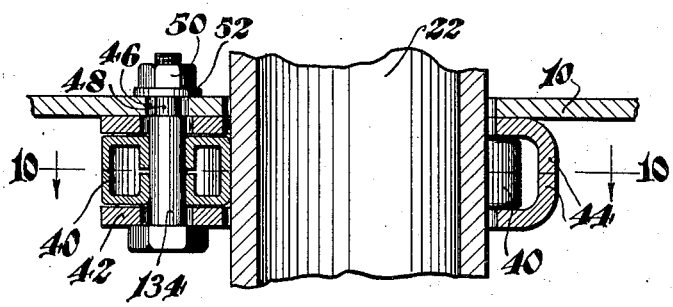
INVENTOR
William J. Andres
BY
ATTORNEY Patented May 17, 1932

1,858,354

UNITED STATES PATENT OFFICE

WILLIAM J. ANDRES, OF SOUTH BEND, INDIANA, ASSIGNOR TO BENDIX BRAKE COMPANY, OF SOUTH BEND, INDIANA, A CORPORATION OF ILLINOIS

BRAKE

Application filed March 2, 1929. Serial No. 343,963.

This invention relates to brakes, and is illustrated as embodied in novel shaft mechanism for operating a system of four-wheel automobile brakes. An object of the invention is to provide strong but inexpensive mechanism in which most of the parts can be made up as steel stampings. Various features of novelty relate to the mounting of the shaft, to a novel one-way lever for operating it, and to simplified operating levers mounted on and keyed to the shaft.

The above and other objects and features of the invention, including various novel and desirable structural details, will be apparent from the following description of the illustrative embodiment shown in the accompanying drawings, in which:

Figure 1 is a top plan view of an automobile chassis, showing the arrangement of the novel shaft mechanism;

Figure 2 is a section on the line 2—2 of Figure 1, showing the shaft mechanism in rear elevation;

Figure 3 is a section on the line 3—3 of Figure 2, showing the improved one-way lever in side elevation;

Figure 4 is a section through the lever on the line 4—4 of Figure 3;

Figure 5 is an elevation of the shaft mechanism, looking in the direction of the arrows 5—5 in Figure 2;

Figure 6 is a section on the line 6—6 of Figure 2, showing the shaft mounting;

Figure 7 is a partial section on the line 7—7 of Figure 6, showing the adjustment of the shaft mounting;

Figure 8 is a horizontal section, on the line 8—8 of Figure 5, through one of the operating levers on the shaft;

Figure 9 is a rear elevation of this lever;

Figure 10 is a section on line 10—10 of Figure 11 corresponding to Figure 6, but showing a modified shaft mounting; and Figure 11 is a section through the modified mounting, on the line 11—11 of Figure 10.

The chassis illustrated includes a frame 10 supported on axles 12 and 14 provided with road wheels 16 having brakes 18 operated by rods or the like 20. The brakes are operated through rods 20 by a novel transverse shaft 22 connected by a rod or the like 24 to a pedal 26 or other operating device. The present invention relates to shaft 22 or its equivalent, and to its mounting and operation.

The shaft itself in order to secure lightness and strength in an inexpensive construction, may be a length of tubing, bent or cranked at 28 to clear the propeller shaft. At its ends the shaft is preferably journaled in a mounting comprising three pivots 30, 32, and 34, carried by the frame 10 and spaced approximately 120° apart around the shaft, and on which are mounted relatively large stamped steel rollers 36 engaging and jointly embracing the shaft. Snap rings 38 (Figure 6) may be used to hold the rollers on the pivots.

Preferably the lower pivots 30 and 32, which determine the fore-and-aft position of shaft 22, are fixed with respect to the frame. Manufacturing inaccuracies, etc., may be compensated for by making pivot 34 an adjustable eccentric, as shown in Figure 7, so that it may be turned to shift its roller 36 bodily toward and from a line joining pivots 30 and 32.

An alternative mounting is shown in Figures 10 and 11. In this case, the bearing includes three rollers 40, each made up by welding or otherwise securing together edge to edge a pair of cup-shaped steel stampings. These rollers are arranged between two triangular carrier stampings 42 having, between the rollers, inturned flanges 44 meeting edge to edge and which may, if desired, be butt-welded together.

The carrier stampings have three pivots 130, 132, and 134, the first two being ordinary bolts securing the bearing assembly to a frame member 10. Pivot 134 passes through an elongated radial slot 46 in frame 10, and is shouldered to engage the inner face of the frame member and provide a reduced-diameter threaded portion 48 passing through slot 46. A nut 50 resting against a washer 52 is threaded on the outer end of portion 48. By tightening nut 50 lightly, then tapping lightly on bolt 134 or nut 50 until the roller 40 engages the shaft, and finally fully tightening nut 50, the roller 40 is adjusted bodily toward or from a line joining pivots 130 and 132.

Each lever 54 mounted on the end of shaft 22, and to the upper and lower ends of which rods 20 are connected, comprises preferably a steel stamping including lever portions 56 bent parallel to each other and connected by spaced webs 58, spaced apart but in vertical alinement. Webs 58 are generally cylindrical, and cooperate with side portions 56 to define two alined bosses adapted to receive a clamping bolt 60 which can be tightened to contract the hub of the lever on the shaft. The ends of rods 20 project between the spaced side lever portions 56 and are connected thereto by transverse pivots 62.

A transverse key 64 may be pressed into place in each end of shaft 22, through suitable openings formed therein, the key being of such a length that one or both of the ends projects beyond the periphery of the shaft. Lever 54 has notches 66 extending transversely across its hub, to receive the projecting ends of key 64 when the lever is slid into place axially of the shaft. When so moved into place, the tightening of bolt 60 holds it there.

A novel one-way connection between lever or pedal 26 and the shaft is provided. Preferably this is in the form of a stamped steel lever having spaced parallel sides 70 embracing between them the end of rod 24 and connected thereto by a pivot 72. These sides 70 are integrally connected by a web 74. Lug portions 76 stamped from the sides 70 project transversely edge to edge across the space between the sides.

After the above described lever is slid axially into place on shaft 22, with its hub embracing the shaft, a stamping 80 is welded to the exterior of the shaft between the sides 70, thus preventing axial shifting of the lever. Stamping 80 is bent to form an abrupt shoulder or stop which is operatively engaged by the lugs 76 of the lever when the lever is turned counter-clockwise (Figure 3).

The operating levers shown in detail in Figures 3, 4, 5, 8, and 9 are described and claimed in my co-pending divisional application Serial No. 566,945 filed October 5, 1931.

While various illustrative constructions have been described in detail, it is not my intention to limit the scope of the invention to those particular constructions, or otherwise than by the terms of the appended claims.

I claim:

1. A shaft support comprising a single stamping bent upon itself to provide a housing having a transverse opening, a plurality of antifriction members positioned in the housing with their peripheries extending over the perimeters defining the opening and means for shifting the position of one of the members relative to the opening.

2. A shaft support comprising a stamping bent upon itself to provide a triangular housing having a central opening, anti-friction rollers positioned in the housing in the apexes thereof with their peripheries extending over the opening and means for adjusting the relative position of one of the rollers to the opening.

3. A shaft support comprising a single stamping bent upon itself to provide a housing having parallel side portions substantially in the form of a triangle with a transverse opening, anti-friction rollers positioned in the housing in the apexes thereof with their peripheries extending into the opening and means for adjusting at least one of the rollers relative to the opening.

4. A shaft support comprising a single stamping bent upon itself to provide a triangular housing having parallel sides provided with registering openings, rollers positioned for rotation within the housing in the apexes thereof having their peripheries extending beyond the perimeters of the respective openings and means for adjusting one of the rollers relative to the opening.

In testimony whereof, I have hereunto signed my name.

WILLIAM J. ANDRES.